(12) United States Patent
Dickenson

(10) Patent No.: US 7,779,223 B2
(45) Date of Patent: *Aug. 17, 2010

(54) MEMORY LEAKAGE MANAGEMENT

(75) Inventor: Marc Alan Dickenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/052,442

(22) Filed: Mar. 20, 2008

(65) Prior Publication Data

US 2008/0168444 A1    Jul. 10, 2008

Related U.S. Application Data

(63) Continuation of application No. 10/976,269, filed on Oct. 28, 2004, now Pat. No. 7,398,369.

(51) Int. Cl.
G06F 12/00 (2006.01)
(52) U.S. Cl. ..................................... 711/170
(58) Field of Classification Search ................. 711/170
See application file for complete search history.

(56) References Cited

U.S. PATENT DOCUMENTS

| | | | |
|---|---|---|---|
| 5,561,786 A | 10/1996 | Morse | |
| 5,790,778 A | 8/1998 | Bush et al. | |
| 5,828,883 A | 10/1998 | Hall | |
| 5,950,211 A | 9/1999 | Shealy | |
| 6,070,009 A | 5/2000 | Dean et al. | |
| 6,078,744 A | 6/2000 | Wolczko et al. | |
| 6,189,141 B1 | 2/2001 | Benitez et al. | |
| 6,560,773 B1 | 5/2003 | Alexander, III et al. | |
| 6,658,652 B1 | 12/2003 | Alexander, III et al. | |
| 6,782,462 B2 * | 8/2004 | Marion et al. | 711/170 |
| 7,089,537 B2 | 8/2006 | Das et al. | |
| 7,257,692 B2 | 8/2007 | Schumacher | |
| 7,296,261 B2 | 11/2007 | Witchel et al. | |
| 2002/0073403 A1 | 6/2002 | Fleehart et al. | |
| 2004/0103195 A1 | 5/2004 | Chalasani et al. | |
| 2005/0044538 A1 | 2/2005 | Mantripragada | |

(Continued)

OTHER PUBLICATIONS

Understanding of the Linux Kernel by Daniel P. Bovet and Marco Cesati Publication year Oct. 2000; ISBN 0-596-00002-2; Publisher: O'Reily; Chapters 6 and 7.

Primary Examiner—Matt Kim
Assistant Examiner—Hamdy S Ahmed
(74) Attorney, Agent, or Firm—Diana R. Gerhardt; Schubert Law Group PLLC

(57) ABSTRACT

Methods, systems, and media to enhance memory leakage management by identifying a suspect allocation pattern during execution of a task, which may be indicative of memory leakage and implementing measures to protect against memory leakage based upon the suspect allocation pattern, are disclosed. More specifically, embodiments may detect a suspect allocation pattern by monitoring memory allocations and deallocations for tasks. The pattern of memory allocations and deallocations may then be analyzed to determine whether a suspect allocation pattern exists. For instance, the memory allocations and deallocations may be compared to determine whether there is an increasing net residual allocation left by the task after it has reached a quiescent runtime state. In some embodiments, a suspect allocation pattern exists if the total memory allocation for a task continues to rise after a pre-determined time period.

16 Claims, 5 Drawing Sheets

U.S. PATENT DOCUMENTS

| | | |
|---|---|---|
| 2005/0076184 A1 * | 4/2005 | Schumacher ................ 711/170 |
| 2005/0108581 A1 | 5/2005 | Hayo et al. |
| 2005/0114849 A1 | 5/2005 | Megiddo |
| 2005/0166207 A1 | 7/2005 | Baba et al. |
| 2005/0223361 A1 | 10/2005 | Belbute |
| 2006/0048114 A1 | 3/2006 | Schmidt |
| 2006/0095427 A1 | 5/2006 | Dickenson |

* cited by examiner

MEMORY LEAKAGE MANAGEMENT

CROSS-REFERENCES TO RELATED APPLICATIONS

This application is a continuation application that claims benefit of the earlier filing date of U.S. patent application Ser. No. 10/976,269, entitled "MEMORY LEAKAGE MANAGEMENT", filed on Oct. 28, 2004 now U.S. Pat. No. 7,398,369.

FIELD OF INVENTION

The present invention is in the field of memory management for shared memory. More particularly, the present invention relates to methods, systems, and media to enhance memory leakage management by identifying a suspect allocation pattern during execution of a task, which may be indicative of memory leakage, and implementing measures to protect against memory leakage based upon the suspect allocation pattern.

BACKGROUND

Computer systems are well known in the art. They have attained widespread use for providing computer power to many segments of today's modern society. Computers are available in many different forms such as a desktop, floor standing, or portable computers and include, e.g., one or more central processing units (CPUs) and associated volatile and non-volatile memory. Some computer systems also include a display, an input-output device such as a keyboard and/or a mouse, one or more storage devices such as hard disk drives, and, in many instances, a network interface adapter. One of the distinguishing characteristics of these systems is the use of a motherboard or system planar to electrically connect these components together. Examples of such computer systems are IBM's e-Server series, ThinkPad series, and Intellistation series.

The widespread use of personal computers in conjunction with networks has resulted in a reliance on the network resources such as e-business enterprises for, e.g., telecommuting, obtaining news and stock market information, trading, banking, shopping, shipping, communicating in the form of Voice Internet protocol (VoiceIP) and email, as well as other services. For many, PCs represent an essential tool for their livelihood. Thus, in today's networked world, the availability and performance of the network is as important as the availability and performance of the personal computer.

Today's e-business environment is very competitive so there is no room for failure. Servers such as the IBM pSeries help e-business enterprises remain competitive by remaining operational 24/7, 365 days a year. Because reliability is mission-critical, such servers include features to monitor for problems, features to correct or bypass minor problems on the fly, and hot swappable components to allow failed components to be replaced without powering down the server.

The problem of memory leakage, however, is not adequately addressed. Memory leakage refers to situations in which a task fails to deallocate at least some of the memory allocated to the task. For instance, when being executed, a task is allocated a portion of a heap, or other shared memory, to store variables, perform calculations, or the like. Once the task no longer needs to use the memory, the memory should be deallocated so it is available for allocation to other tasks. Memory leakage occurs when some portion of memory is not deallocated even though a task may no longer need the memory. Moreover, that same task, when executed again may be allocated more memory and may not deallocate all of that memory either, resulting in a continual leakage that can eventually consume so much of the shared memory that insufficient memory is available for other tasks.

In many instances, memory leakage remains undetected. In the latter instances, the computer system produces an "out of memory" error the next time some task needs a memory allocation and reports the error along with an identification of the task that requested the memory. The source of the memory leakage, however, is not detectable from the available information so the group of tasks must be restarted and, depending upon how critical the tasks are on the operation of the computer system, the entire computer system may need to be powered down and rebooted.

Further, memory leakage may occur only under specific circumstances that result from a combination of tasks being executed simultaneously. Thus, debugging the error is difficult post-mortem.

Many servers forward the "out of memory" error to a technical service provider to resolve the error. The technical service provider must re-create the circumstances to reproduce the memory leakage and/or review thousands or hundreds of thousands of lines of code to find the code responsible for the memory leakage. In many instances, one or more highly experienced software "trouble-shooters" may work on the problem for months before finding a solution, while the customer continues to endure the problem.

Restarting the application or rebooting the computer system, temporarily fixes the memory leakage condition. However, powering down and rebooting a network server significantly impacts the availability and reliability of the server, which is a very undesirable effect when availability and reliability are key features for distinguishing the server from a multitude of available servers on the market. For instance, many servers take hours or even days to return to service once they are powered down. Further, the memory leakage condition is not corrected, the condition is just delayed until the next time that the circumstances facilitate a memory leakage by the task.

Therefore, there is a need for methods, systems, and media to enhance memory leakage management by identifying attributes of a task potentially related to memory leakage and implementing measures to protect against memory leakage based upon the attributes identified. In some embodiments, upon detecting a memory leakage associated with a task, the embodiments may generate a signal adapted to terminate and restart the task or to request that the task be terminated and restarted. When the task restarts, memory usage by the task is reset, freeing up the leaked memory.

SUMMARY OF THE INVENTION

The problems identified above are in large part addressed by methods, systems, and media to enhance memory leakage management by identifying a suspect allocation pattern during execution of a task, which may be indicative of memory leakage, and implementing measures to protect against memory leakage based upon the suspect allocation pattern. One embodiment provides a method to manage memory leakage for a computer system. The method generally involves monitoring memory allocations and memory deallocations associated with a task and analyzing the memory allocations and memory deallocations by the task to detect a suspect allocation pattern associated with the memory leakage. Upon detecting the suspect allocation pattern, the method may then generate an output in response to the suspect allocation pattern to attenuate the memory leakage. In some embodiments, a suspect allocation pattern may be a pattern identified by statistical analysis or calculated probability, a pattern of physical runtime characteristics heuristically determined or dynamically determined by a formula, one or more thresholds that serve as alerts or triggers individually or as a group, etc.

Another embodiment provides an apparatus to manage memory leakage for a computer system. The apparatus may include a memory allocation monitor to monitor memory allocations and memory deallocations associated with a task and a leakage manager to analyze the memory allocations and memory deallocations by the task of the computer system to detect a suspect allocation pattern associated with the memory leakage. The leakage manager may then generate an output in response to the suspect allocation pattern to attenuate the memory leakage.

Yet another embodiment provides a machine-accessible medium containing instructions, which when executed by a machine, cause said machine to perform operations. The operations may involve monitoring memory allocations and memory deallocations associated with a task and analyzing the memory allocations and memory deallocations by a task of a computer system to detect a suspect allocation pattern associated with memory leakage. The operations may then generate an output in response to the suspect allocation pattern to attenuate the memory leakage.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
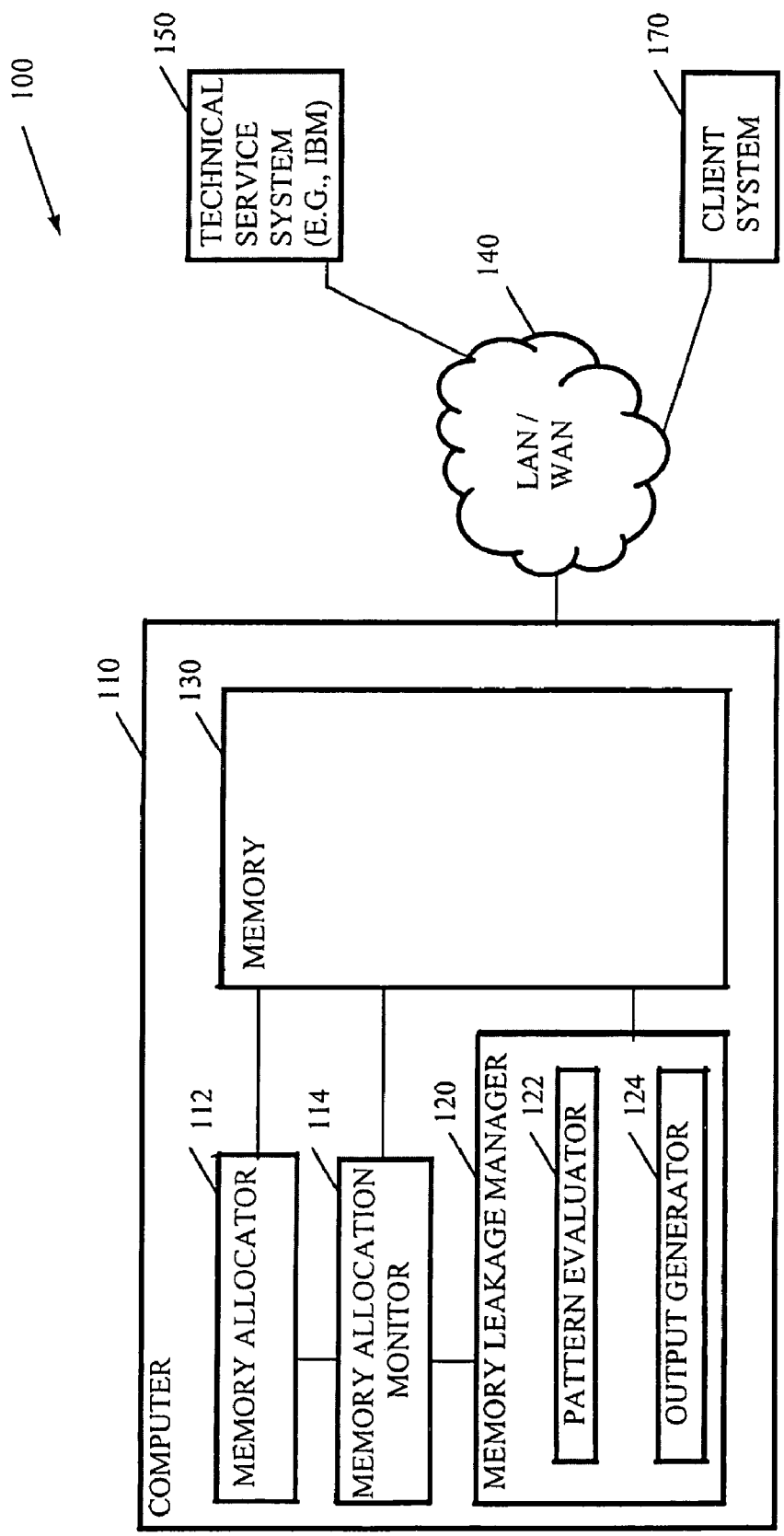
FIG. 1 depicts an embodiment of a system including a computer, which incorporates a memory leakage manager which implements measures to protect against memory leakage based upon detected suspect allocation patterns.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the following discussions disclose methods, systems, and media to enhance memory leakage management. The methods, systems, and media may identify a suspect allocation pattern indicative of memory leakage during execution of a task, and implement measures to protect against memory leakage in response to the suspect allocation pattern. More specifically, embodiments may detect a suspect allocation pattern by monitoring, e.g., a characteristic of memory allocations and deallocations for one or more tasks or total memory allocations and deallocations for one or more tasks. The pattern of memory allocations and deallocations may then be analyzed to determine whether a suspect allocation pattern exists. In some embodiments, a suspect allocation pattern may be a pattern of characteristics identified by statistical analysis or calculated probability, a pattern of physical runtime characteristics heuristically determined or dynamically determined by a formula, one or more thresholds that serve as alerts or triggers individually or as a group, etc. For instance, the memory allocations and deallocations may be compared to determine whether there is a net residual allocation left with the task. In some embodiments, a suspect allocation pattern exists if the total memory allocation for a task continues to rise after a pre-determined time period.

After a suspect allocation pattern is detected, the pattern is logged in an error log and may be reported to a technical service provider. In many embodiments, the suspect action pattern is evaluated to determine whether further action is appropriate. In particular, the suspect pattern may be compared against leakage criteria to decide whether the likelihood and/or potential extent of memory leakage warrant terminating the task. For example, the leakage criteria may offer an extended time period beyond the time period necessary to classify a suspect allocation pattern. If the total allocation continues to rise after this subsequent time period, the task may be terminated to regain any leaked memory. Although the memory leakage problem may return when the task is executed again, the impact of the memory leakage on the computer system is temporarily alleviated and the task with the suspected memory leakage is recorded or tagged as a candidate to be investigated for the root cause of the memory leakage. In several embodiments, suspect patterns of one or more tasks may be evaluated to determine whether the tasks' memory usage profile should be reset by, e.g., terminating and restarting one or more of the tasks.

Further embodiments may dynamically adjust the criteria used for detecting the suspect allocation patterns and/or the criteria that identifies situations that warrant termination of one or more tasks. For instance, a memory leakage manager may identify a suspect allocation pattern by comparing one or more characteristics of memory usage by a task to a set of thresholds. The suspect pattern may arise so often, causing so many reports to be logged and sent to a technical service provider that the memory leakage manager may adjust one or more of the thresholds to reduce the number of reports and logs for the problem. In one embodiment, the memory leakage manager may gauge whether the suspect pattern detection criteria is too sensitive based upon a ratio logs and reports sent to the technical service provider and/or the ratio of reports to the number of times that detection of a suspect allocation pattern leads to terminating and restarting the corresponding task. The suspect allocation pattern criteria may be made more stringent, for example, by extending time periods, increasing and/or decreasing thresholds, etc. In other situations, detection of suspect allocation patterns may too often coincide with termination of the task. In such situations, the criteria for identifying suspect allocation patterns may be made more sensitive to advantageously provide more forewarning that a memory leakage problem is associated with the task.

While portions of the following detailed discussion describe embodiments of the invention in computers such as servers and personal computers, embodiments incorporated into specific purpose machines or other arrangements susceptible to memory leakage resulting from coding errors for a task, are also contemplated.

Turning now to the drawings, FIG. 1 depicts an embodiment of a system 100 including a computer 110 that is adapted to detect suspect allocations patterns associated with tasks that may be indicative of a memory leakage and implement one or more measures to attenuate and/or eliminate the memory leakage. More specifically, system 100 may include computer 110, a local area network/wide area network (LAN/WAN) 140, a technical service system 150, and a client system 170. Computer 110 may be a server such as for an office, an Internet provider service (ISP), or the like. In some embodiments, computer 110 may be a partition of a logically partitioned system.

Computer 110 may be adapted to remain powered on and operational for many years, reporting any software and/or hardware errors to technical service system 150. For example, if an error such as a memory leakage occurs during execution firmware tasks, the computer 110 may log the suspect allocation pattern, report the possible leakage to technical service system 150, and, in some embodiments, restart the firmware. Technical service system 150 may be a technical service provider such as IBM and reporting the possible leakage to technical service system 150 may initiate an effort to determine the source or cause of the memory leakage. In other situations, the memory leakage may cause a service processor executing the task for computer 110 to reset and restart. The memory leakage may even cause computer 110 to power down. In such situations, computer 110 reports the error to technical service system 150, identifying the task(s) associated with the memory leakage.

Computer 110 may include a memory allocator 112, a memory allocation monitor 114, a memory leakage manager 120, and a memory 130. Memory allocator 112 may be hardware and/or software being executed to allocate and deallocate memory for tasks executing on computer 110 such as tasks executing on a service processor.

Memory allocation monitor 114 may be integrated into the base runtime library routines of an operating system and may precisely monitor memory allocations and deallocations associated with tasks to detect patterns. In many embodiments, memory allocation monitor 114 tracks the memory allocations and deallocations for one or more tasks in memory 130. In some embodiments, memory allocation monitor 114 may generate a chronological list of the allocations and deallocations for each task. In further embodiments, memory allocation manager 114 may track a difference between allocations and deallocations for each task. For example, a task requests a memory allocation, memory allocation monitor 114 stores a designation for the task and logical addresses associated with the memory allocation. When the task requests that memory associated with a range of logical addresses be deallocated, the range of logical addresses are compared with the allocated addresses to determine whether any residual logical addresses remain allocated to the task. Residual means allocated to the heap after the program completed its initial load and achieved an operationally quiescent runtime state.

In further embodiments, rather than being integrated into the base library routines that allocate and deallocate memory, memory allocation monitor 114 may use available system calls and utilities to progressively scan and monitor, e.g., total memory statistics for running tasks. Memory allocation monitor 114 may capture an amount of memory represented by a request for a memory allocation and store the amount along with an association with the task in memory 130. Then, upon receipt of a deallocation request by that task, the amount of memory deallocated may be subtracted from the amount of memory still allocated to the task. Amounts of memory associated with allocation and deallocation requests are added to or subtracted from the net amount of memory allocated to the task, respectively, as indicated in memory 130.

Memory leakage manager 120 may be hardware or a representation of a software function adapted to identify and determine or identify patterns of memory allocations and deallocations that are suspected to be indicative of memory leakage. For example, memory leakage monitor 120 may include one or more daemons or agents designed to utilize memory allocation and deallocation data obtained by memory allocation monitor 114 to determine when a task may be leaking memory. In some embodiments, memory leakage manager 120 may an integral part of an operating system for computer 110.

Memory leakage manager 120 may analyze the memory allocations and deallocations based upon information provided via memory allocation monitor 114 by comparing patterns of allocations and deallocations with suspect allocation pattern criteria. In some embodiments, memory leakage manager 120 may compare amounts of memory allocated against threshold allocations. In many embodiments, memory leakage monitor 120 may compare the rise in the net memory allocated to the task at one or more different time periods to determine whether the pattern indicates an unchecked, continual increase in the amount of memory allocated. In further embodiments, memory leakage monitor 120 may compare the total memory allocated to a group of tasks against the portion of memory allocated to each task to determine whether any task maintains significantly more amounts of memory than other tasks.

Memory leakage manager 120 may include a pattern evaluator 122 and an output generator 124. Pattern evaluator 122 may determines whether a suspect allocation pattern of one or more tasks satisfies criteria for terminating one or more of the tasks. For example, memory leakage manager 120 may determine that more than one task have suspect allocation patterns. On an Individual basis, the amount of the memory leakage suspected of each task is small. However, as a whole, the memory leakage meets the leakage criteria designated for determining whether to terminate execution of tasks. In some embodiments, when the suspect tasks are executing within an isolated environment such as within a service processor of computer 110, memory leakage manager 120 may initiate a reset and reload to restart all the tasks executing on the service processor. In further embodiments, memory leakage manager 120 may select and restart individual tasks based upon the extent of the perceived memory leakage, the prominence of the suspect allocation pattern, the ability to restart the task, the systems impacted by the restart, and/or other criteria related to memory usage by the task, systems involved with or impacted by execution of the task, etc.

Figure 1A:
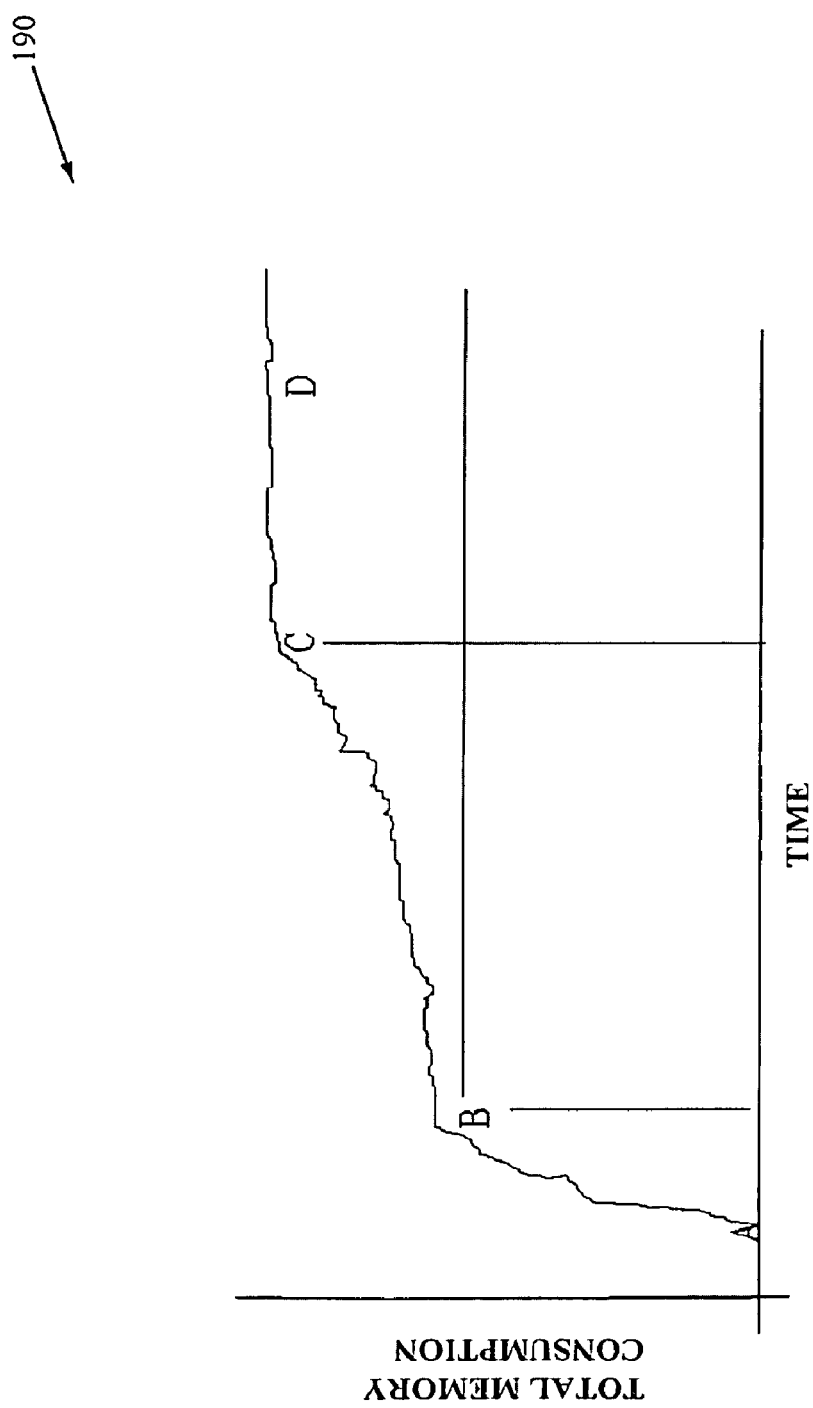
FIG. 1A depicts an example embodiment of a memory usage profile for a task.

FIG. 1A depicts an example of a memory usage profile 190 for a task executing on computer 110 of FIG. 1. In particular, the graph depicts total memory allocation, or consumption, as a function of time. The task is initially started at point "A" and consumes a large amount of memory to load all its dependencies into memory 130 to begin execution. At point "B", the task begins execution, initializing, e.g., data structures, variables, etc., to progress toward a runtime state. At point "C", the task is in a runtime state and is quiescent. In other words, at point "C", total memory consumption reaches a substantially steady state although the total memory consumption may temporarily rise or lower depending upon processes being run on computer 110. "D" depicts the time period after the task reaches point "C". During the time period of "D", memory leakage manager 120 looks for suspicious memory usage patterns, or memory allocation patterns. In many embodiments, the level of memory consumption by the task at point "C" is not taken into consideration by memory leakage manager 120 when detecting suspect allocation patterns.

Figure 1B:
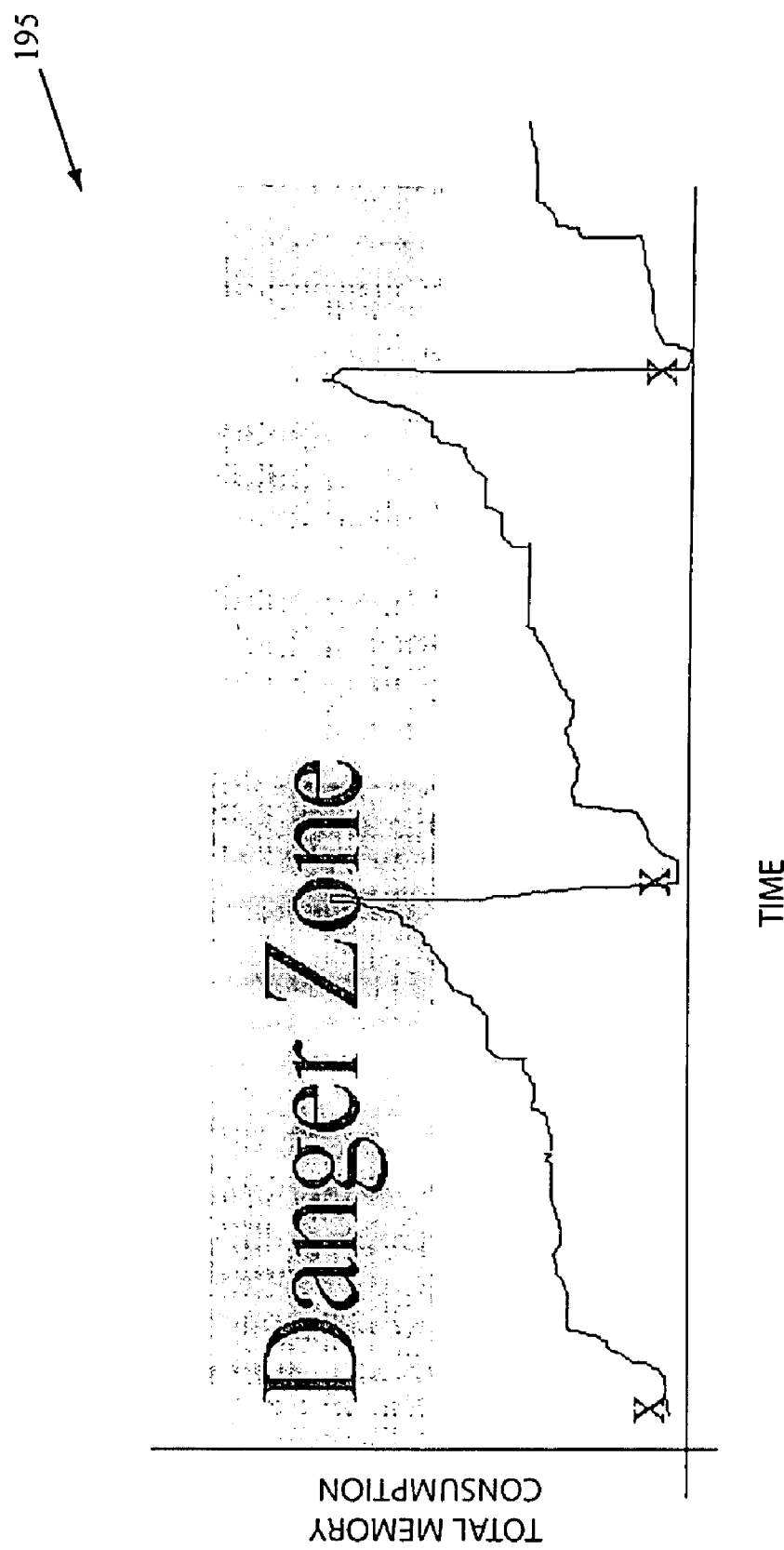
FIG. 1B depicts an example embodiment of a memory usage profile for a task running on the computer in FIG. 1, which is reset periodically based upon a suspect allocation pattern.

FIG. 1B depicts an example of a memory usage profile 195 when the task of FIG. 1A is leaking memory as well as criteria for determining when to terminate and restart the task. In particular, the graph illustrates total memory consumption for the task as a function of time and the "danger zone" represents thresholds of total memory consumption that are indicative of a memory leakage. Each "X" represents a point in time at which the memory leakage manager 120 determines the total memory usage profile should be reset by terminating and restarting the task. Note that when the task is terminated, the memory allocations associated with the task are released, freeing the leaked memory. Freeing the leaked memory may advantageously prevent computer 110 from crashing or facilitate a controlled restart of computer 110.

Output generator 124 may generate outputs for memory leakage manager 120 based upon analysis of the allocations and deallocations and of the suspect allocation patterns arising from analysis of the allocations and deallocations. In many embodiments, output generator 124 may log suspect allocation patterns in non-volatile memory of memory 130. In such embodiments, the suspect allocation patterns may also be reported to technical service system 150.

In some situations, there are time critical or real-time operations in progress when memory leakage manager 120 detects a memory leakage that requires the termination and restart of a task. In such situations, if terminating and restarting the task will affect the critical operations, output generator 124 may select an opportune time to generate a signal to terminate and restart the task. For instance, output generator 124 may delay until the time critical or real-time operations cease and then generate the signal. In several embodiments, after termination, tasks are adapted to re-synchronize to an operational runtime state without any noticeable effect on the operation of computer 110. In some embodiments re-synchronizing the task may result in a slight degradation in performance during the re-synchronization process.

When pattern evaluator 122 decides to terminate one or more tasks, output generator 124 may generate requests to restart the tasks, reset and reload a service processor, reboot computer 110, and/or the like. In some embodiments, output generator 122 may pause non-critical tasks while a task is being restarted. Critical tasks with respect to the operation of computer 110 may continue to execute while one or more tasks are restarted. If critical tasks may not continue to execute while a task or a system is being restarted, output generator 124 may power down and reboot computer 110.

Memory 130 may be a combination of volatile memory and non-volatile memory designed to store and facilitate access to runtime data for tasks as well as to maintain logs of suspect allocation patterns when computer 110 is powered down. The task may be a function for any level of an application from a high level, e.g., word processor, to a low-level firmware code for a service processor. For instance, memory 130 may include RAM, dynamic RAM, double data rate RAM, synchronous dynamic RAM, read only memory (ROM), flash memory and/or other data storage medium.

LAN/WAN 140 is a network connection to couple computer 110 with technical service system 150 and client system 170 to facilitate communications. In some embodiments, LAN/WAN 140 may include a network in an office coupled via Ethernet, optical media like OptiConnect, a wireless network, or the like. In several embodiments, LAN/WAN 140 also couples with the Internet via a cable modem, a digital subscriber line (DSL), a T1 line, a T3 line, or the like. In further embodiments, LAN/WAN 140 may include a network of temporary connections such as connections via a telephone system.

Client system 170 may be a computer system at a different office location or at a client's facility. Client system 170 may include any type of computer system or data storage system having a TCP/IP interface, or the like, for receiving and transmitting transactions via LAN/WAN 140. In several embodiments, the availability of computer 110 is critical for operations performed by client system 170.

Figure 2:
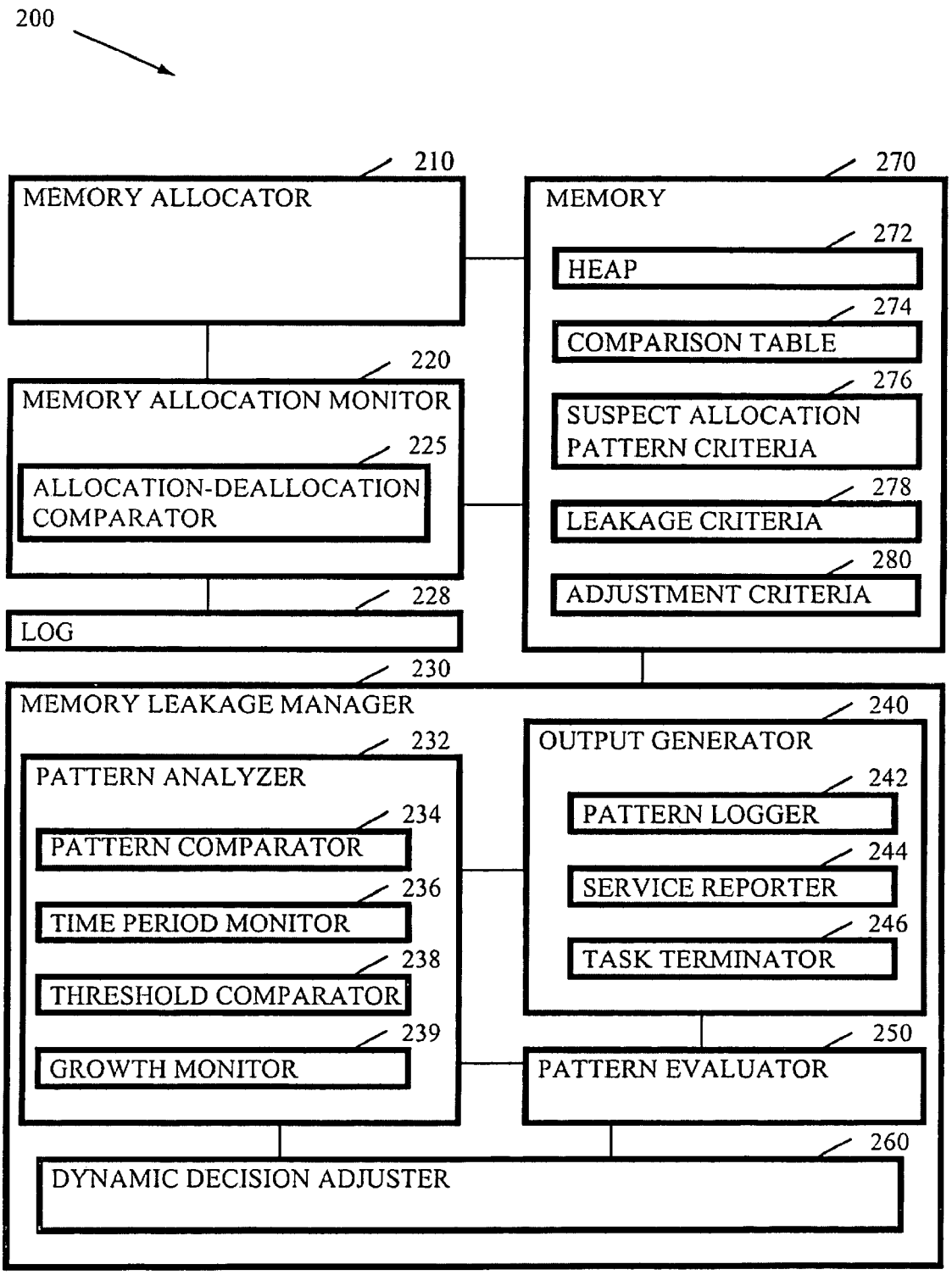
FIG. 2 depicts an embodiment of an apparatus adapted to detect a suspected memory leakage associated with execution of a task and take protective actions based upon an impact of the suspected leakage.

FIG. 2 depicts an embodiment of an apparatus 200 adapted to detect a suspected memory leakage associated with execution of a task and take protective actions based upon an impact of the suspected memory leakage. Apparatus 200 includes a memory allocator 210, a memory allocation monitor 220, a log 228, a memory leakage manager 230, and a memory 270.

Memory allocator 210 may establish heap 272 in volatile memory of memory 270 in response to allocation requests for tasks as the tasks are loaded and executed. The allocation requests may be coded in the tasks and/or may reside in firmware. Memory allocator 210 may also respond to deallocation requests associated with tasks. For instance, when a task no longer requires the use of a range of logical addresses, the task may generate a deallocation request so that the memory becomes available to other tasks.

Memory allocation monitor 220 may monitor memory allocations and memory deallocations associated with a task. Memory allocation monitor 220 may include an allocation-deallocation comparator 225. Allocation-deallocation comparator 225 may maintain a comparison table 274 in memory 270 to track allocations and deallocations for tasks. When a task is done and terminates, the entry in the table 274 may be cleared. However, while the task executes, allocation-deallocation comparator 225 may generate comparisons for each allocation and deallocation request. In some embodiments, the comparison may be a net amount of memory remaining allocated to the task after one or more allocations and deallocations. In other embodiments, allocation-deallocation comparator 225 may generate comparisons based upon memory addresses or address ranges.

Log 228 may be a non-volatile memory such as non-volatile random access memory (NVRAM) or flash memory and is adapted to maintain a log of suspect allocation patterns as well as the task(s) identified with the patterns. In many embodiments, the log also includes an indication regarding the number of times that the task is restarted as a result based upon the suspect allocation pattern(s). The log associated with a particular task may then be transmitted along with reports about the task to a technical service provider.

Memory leakage manager 230 monitors allocations and deallocations of heap 272 in memory 270 to detect suspect allocation patterns indicative of memory leakage. Memory leakage manager 230 may include a pattern analyzer 232, an output generator 240, a pattern evaluator 250, and a dynamic decision adjuster 260.

Pattern analyzer 232 may analyze memory allocations and deallocations to detect suspect allocation patterns. For example, pattern analyzer 232 may determine that a net result of the memory allocations and the memory deallocations is an increase in an amount of memory allocated for the task. The net amount remaining allocated to the task may be compared with an anticipated amount of memory to see is more memory is allocated to the task than expected. The expected amount may be, e.g., a threshold amount stored in suspect allocation pattern criteria 276 of memory 270 that a designer does not expect any task to surpass, an amount the designer does not expect that type of task to surpass, and/or an amount of memory that the designer does not expect that specific task to surpass. In several embodiments, more than one of these thresholds may be compared with the memory allocated to the task. In further embodiments, the amount may be in the form of a percentage of the memory allocated to particular tasks or types of tasks with respect to the total memory allocated to tasks or with respect to the size of the heap 272.

Pattern analyzer 232 may instead of or in addition to comparing the amount of memory allocated to the task, monitor the net increase in the amount of memory allocated to a task. If the net increase in allocations for a task appears to continually rise beyond a threshold time period, pattern analyzer 232 may determine that the rise is likely a memory leakage and log the pattern as a suspect pattern associated with the task.

Output generator 240 may log the task to indicate the detection of the suspect allocation pattern, report the detection of the suspect allocation pattern for the task to a technical service provider and/or terminate the task. Output generator 240 may include a pattern logger 242, a service reporter 244, and a task terminator 246.

Pattern logger 242 may be a daemon or other code executing on a computer system to log problems related to memory leakage. Pattern logger 242 may be responsive to pattern analyzer 232 and pattern evaluator 250 to store a log entry associated with a task that indicates suspect allocation pattern has been detected and, in some embodiments, provide more detailed information about the task and/or the suspect allocation pattern.

Service reporter 244 may also be a daemon or other code executing on the computer system. Service reporter 244 may periodically report suspect allocation patterns to a technical service provider. In further embodiments, service reporter 244 may report the detection of a suspect allocation pattern in response to the detection. In other embodiments, service reporter 244 may only report the suspect allocation pattern and/or pattern history in response to an indication from pattern evaluator 250. The report may include just the single event for one task, an event history for one task, or an event history for multiple tasks. In one embodiment, event histories are periodically provided for any task that is repeatedly associated with a suspect allocation pattern.

Task terminator 246 may be responsive to pattern evaluator 250 to terminate a task associated with a suspect allocation pattern to attenuate possible memory leakage. Terminating a task responsible for memory leakage stops the leakage until the task is restarted and, may advantageously, prevent or attenuate the impact of memory leakage by the task on other tasks concurrently executing.

Task terminator 246 may issue a request to restart the task. If the task is critical to operations of the computer however, the environment within which the task executes, such as a service processor, may have to be restarted. In some situations, the computer may have to be restarted to restart the task. In such situations, the memory leakage may not trigger a reboot of the computer until a significant amount of memory leakage has occurred.

Pattern evaluator 250 may evaluate the suspect allocation pattern in accordance with leakage criteria 278 to determine whether to terminate execution of the corresponding task. More specifically, after pattern analyzer 232 detects a suspect allocation pattern, pattern analyzer 232 transmits an indication of the suspect allocation pattern to output generator 240 to log and possibly report the suspect allocation pattern to a technical service provider. Pattern analyzer 232 may also transmit an indication of the suspect allocation pattern to pattern evaluator 250 to determine whether additional action is warranted. Pattern evaluator 250 then compares characteristics of the suspect allocation pattern such as the total amount of memory allocated, the percentage of the total heap allocated, the percentage of the total amount of memory allocated, or the like against the suspect pattern detected for the particular task. If one or more of the leakage criteria 278 or a pattern of the leakage criteria 278 are met, pattern evaluator 250 may instruct output generator 240 to report and incident to the technical service provider and/or terminate execution of one or more of the currently executing tasks.

Dynamic decision adjuster 260 is adapted to monitor detection of suspect allocation patterns as well as decisions to report the patterns and terminate the tasks. Dynamic decision adjuster 260 may then determine whether adjustments should be made to the suspect allocation pattern criteria 276 and/or leakage criteria 278 based upon an evaluation of the effectiveness of the criteria. For instance, if pattern analyzer 232 continually detects a suspect allocation pattern for a task but the suspect allocation pattern does not rise to a level that causes pattern evaluator 250 to terminate the task for a threshold time period described in adjustment criteria 280, suspect allocation criteria 276 is being met too early for the task and/or leakage criteria 278 is too stringent to catch the memory leakage problem. Therefore, dynamic decision adjuster 260 may determine based upon adjustment criteria 280 to adjust suspect allocation criteria 276 and/or leakage criteria 278.

In some embodiments, dynamic decision adjuster 260 may determine to adjust leakage criteria 278 based upon numbers and/or types of other errors encountered. For example, if pattern analyzer 232 repeated detects a suspect allocation pattern for a task but pattern evaluator 250 does not terminate the task, dynamic decision adjuster 260 may adjust leakage criteria by an increment indicated in adjustment criteria 280 in response to an out of memory error for any task.

In further embodiments, dynamic decision adjuster 260 may determine to adjust the sensitivity associated with suspect allocation pattern criteria 276 when, e.g., pattern evaluator 250 repeatedly terminates a task for the same event that pattern analyzer 232 first recognizes a suspect allocation pattern associated with the task.

Figure 3:
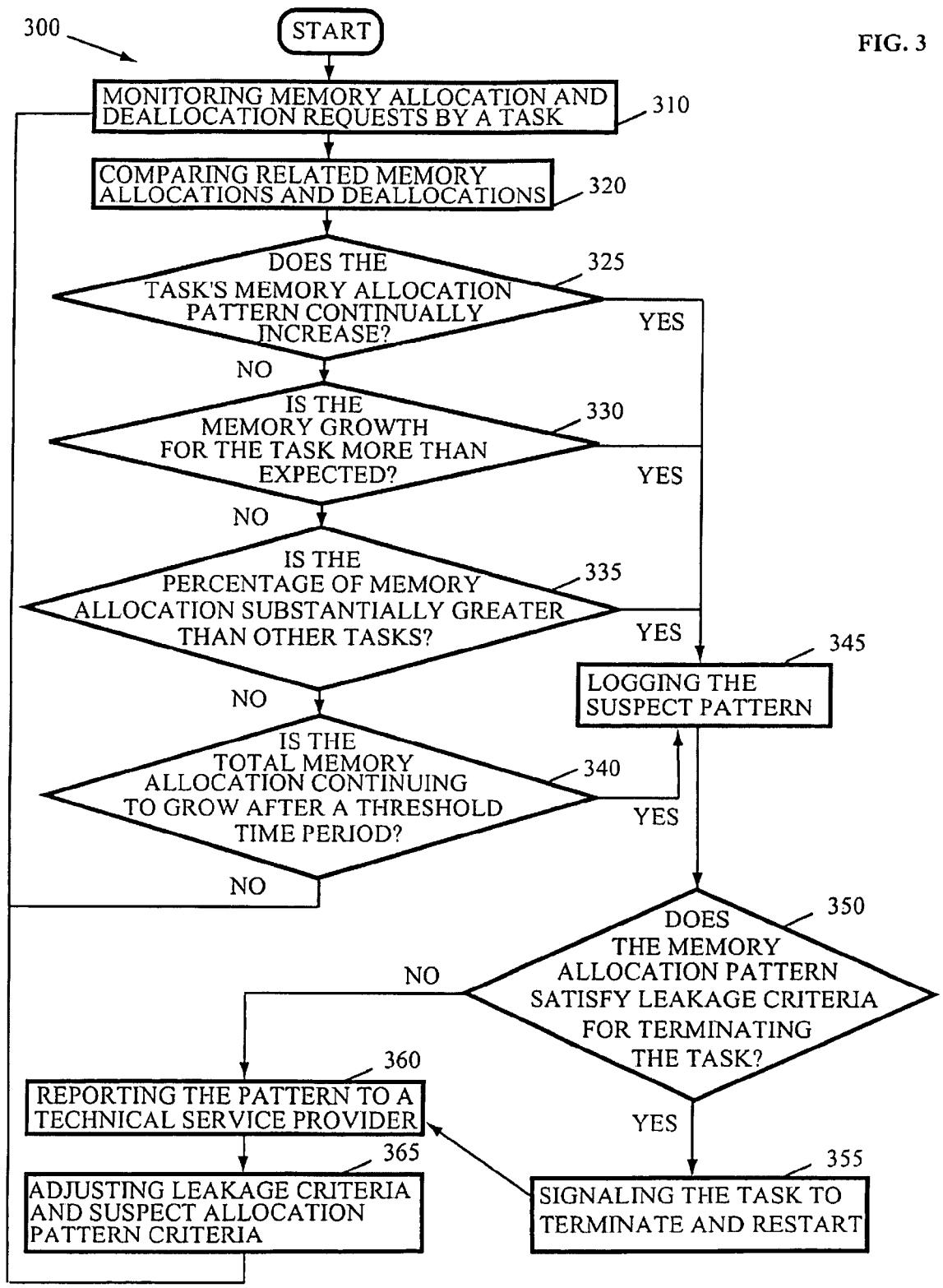
FIG. 3 depicts a flowchart of an embodiment adapted to detect a suspect allocation pattern associated with execution of a task and implement measures to protect against memory leakage based upon the suspect allocation pattern.

Referring now to FIG. 3, there is shown a flowchart of an embodiment adapted to detect a suspect allocation pattern associated with execution of a task and implement measures to protect against memory leakage based upon the suspect allocation pattern. Flow chart 300 begins with monitoring memory allocation and deallocation requests by a task (element 310). In particular, a memory leakage manager such as the memory leakage manager in FIG. 1, may monitor the allocations and deallocations for each task to facilitate identification of an allocation pattern possibly indicative of memory leakage. In many embodiments, the memory allocations and deallocations for each task may be stored in a table format in memory.

In several embodiments, in addition to storing indications of the memory allocations and deallocations, the allocations and deallocations are compared to determine a net residual allocation amount for the task. In many such embodiments, the logical memory addresses for the allocations and deallocations may be compared to determine the net residual allocation. In other embodiments, the net residual allocation may be calculated without reference to the logical memory addresses of the deallocated memory.

The flowchart continues with comparing aspects of the memory allocations and deallocations against suspect allocation pattern criteria. In particular, the memory leakage manager determines whether the memory allocation pattern continues to increase the amount of memory allocated to the task (element 325). If so, the suspect allocation pattern is logged to and associated with the task (element 345). If not, the memory leakage manager may determine whether growth of the memory allocated for the task is greater or at a greater rate than expected (element 330).

When the growth of the amount of memory allocated to the task is greater than a threshold for criteria indicative of memory leakage, the memory leakage manager may determine whether the percentage of memory allocated to the task with respect to that allocated to other tasks is greater than a threshold percentage (element 335). If so, the suspect allocation pattern is logged to and associated with the task (element 345). If not, the memory leakage manager may determine whether the total memory allocated to the task continues to rise after a threshold time period (element 340). If so, the suspect allocation pattern is logged to and associated with the task (element 345). If not, the memory leakage manager may just continue to monitor that task and other tasks for suspect memory allocation patterns.

Once a suspect allocation pattern is logged, the memory leakage manager may determine whether aspects of execution of the task and possibly other tasks satisfy leakage criteria for terminating the task (element 350). If, for instance, the amount of memory allocated to a task is much greater than anticipated, the amount of memory may exceed the threshold and execution of the task is terminated (element 355). For example, the memory leakage manager may transmit a signal to the task to terminate and restart. In such embodiments, the tasks may be adapted for the terminating and restarting process and may implement steps to prepare for termination rather than abruptly ending.

In either situation, the suspect allocation pattern associated with the task may then be reported to a technical service provider in the hopes that the technical service provider will eventually solve the memory leakage (element 360). In some embodiments, the log of suspect allocation pattern detections may also be forwarded to the technical service provider, advantageously offering the technical service provider with a significant amount of data for determining the source of a memory leakage problem.

After reporting the suspect allocation pattern to the technical service provider, the criteria utilized to determine the presence of memory leakage may be adjusted (element 365) based upon an evaluation of the performance of the suspect allocation pattern criteria and the leakage criteria. More specifically, criteria may be set forth to determine the effectiveness of the suspect allocation pattern criteria and the leakage criteria such as the number of log entries for suspect allocation patterns prior to termination of the task, the ability to terminate the task before an out of memory error occurs, the number of memory errors that occur before a suspect pattern is detected, or the like.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates enhancing memory leakage management by identifying a suspect allocation pattern during execution of a task, which may be indicative of memory leakage, and implementing measures to protect against memory leakage based upon the suspect allocation pattern. It is understood that the form of the invention shown and described in the detailed description and the drawings are to be taken merely as examples. It is intended that the following claims be interpreted broadly to embrace all the variations of the example embodiments disclosed.

The invention claimed is:

1. A computer system for managing memory leakage, the computer system comprising:
   a central processing unit (CPU);
   a memory coupled to the CPU;
   a memory allocation monitor, coupled to the memory, to monitor memory allocations and memory deallocations associated with a task of the computer system; and
   a leakage manager, coupled to the memory allocation monitor and memory, for: i) analyzing the memory allocations and memory deallocations by the task of the computer system to detect a suspect allocation pattern associated with the memory leakage; ii) determining to terminate the task in response to an evaluation of the suspect allocation pattern and an impact of restarting the task on other operations by the computer system; iii) selecting a time to terminate the task after time critical operations cease if termination of the task will affect a critical operation in progress; and iv) generating an output in response to selecting the time to terminate the task to attenuate the memory leakage.

2. The computer system of claim 1, wherein the leakage manager comprises a pattern evaluator to evaluate the suspect allocation pattern to determine whether to terminate execution of the task.

3. The computer system of claim 2, wherein the leakage manager comprises a dynamic decision adjuster to evaluate an effectiveness of criteria utilized to terminate the execution of the task and to adjust the criteria based upon the effectiveness.

4. The computer system of claim 1, wherein the leakage manager comprises a dynamic decision adjuster to evaluate an effectiveness of criteria utilized to identify the suspect allocation pattern and to adjust the criteria based upon the effectiveness.

5. The computer system of claim 1, wherein the leakage manager comprises a pattern analyzer to determine that a net result of the memory allocations and the memory deallocations is an increase in an amount of memory allocated for the task.

6. The computer system of claim 1, wherein the leakage manager comprises a pattern analyzer to determine whether a net result of the memory allocations and the memory deallocations is an amount of memory allocated for the task that is greater than a threshold amount of memory.

7. The computer system of claim 1, wherein the leakage manager comprises a pattern analyzer to determine that a net result of the memory allocations and the memory deallocations is an amount of memory allocated for the task that continues to increase beyond a threshold time period.

8. The computer system of claim 1, wherein the leakage manager comprises an output generator to log the task to indicate the detection of the suspect allocation pattern and to report the detection of the suspect allocation pattern for the task to a technical service provider.

9. The computer system of claim 8, wherein the output generator comprises a task terminator to terminate the task to attenuate the memory leakage.

10. A machine-accessible storage medium containing instructions, which when executed by a computer system, cause said computer system to perform operations, comprising:

monitoring memory allocations and memory deallocations associated with a task of the computer system;

analyzing the memory allocations and memory deallocations by the task of a the computer system to detect a suspect allocation pattern associated with memory leakage;

determining to terminate the task in response to an evaluation of the suspect allocation pattern and an impact of restarting the task on other operations by the computer system;

selecting a time to terminate the task after time critical operations cease if termination of the task will affect a critical operation in progress; and generating an output in response to selecting the time to terminate the task to attenuate the memory leakage.

11. The machine-accessible storage medium of claim 10, wherein determining to terminate the task comprises evaluating the suspect allocation pattern to determine whether to terminate execution of the task.

12. The machine-accessible storage medium of claim 10, wherein the operations further comprise dynamically adjusting criteria for identifying the suspect allocation pattern based upon a determined effectiveness of the identification.

13. The machine-accessible storage medium of claim 10, wherein the operations further comprise dynamically adjusting criteria for terminating the task based upon a determined effectiveness for selection of the task for termination.

14. The machine-accessible storage medium of claim 10, wherein analyzing the memory allocations and memory deallocations comprises determining whether the memory deallocations release an amount of memory equivalent to an amount of memory acquired via the memory allocations.

15. The machine-accessible storage medium of claim 10, wherein analyzing the memory allocations and memory deallocations comprises determining whether a pattern exhibited by the memory allocations and the memory deallocations is anticipated to continue to increase the amount of memory allocated for the task.

16. The machine-accessible storage medium of claim 10, wherein generating the output comprises logging the task to indicate the detection of the suspect allocation pattern.

* * * * *